(12) United States Patent
Kurematsu et al.

(10) Patent No.: US 6,883,922 B2
(45) Date of Patent: Apr. 26, 2005

(54) DISPLAY APPARATUS

(75) Inventors: Katsumi Kurematsu, Kanagawa (JP); Toshihiro Sunaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/924,430

(22) Filed: Aug. 8, 2001

(65) Prior Publication Data

US 2002/0057421 A1 May 16, 2002

(30) Foreign Application Priority Data

Aug. 10, 2000 (JP) ........................................ 2000-242259

(51) Int. Cl.⁷ ................................................ G02B 5/10
(52) U.S. Cl. ........................ 359/859; 353/99; 348/744
(58) Field of Search .................. 359/364, 365, 359/366, 460, 834, 857, 858, 859, 861, 864, 449, 454–457, 459; 353/98, 99, 119, 37, 77, 78; 348/744, 782, 783, 784

(56) References Cited

U.S. PATENT DOCUMENTS

| | | | |
|---|---|---|---|
| 4,971,436 A | * 11/1990 | Aoki et al. ................... 353/31 |
| 5,100,222 A | * 3/1992 | Minoura et al. ............. 359/455 |
| 5,191,472 A | * 3/1993 | Kurematsu et al. ......... 359/619 |
| 5,495,306 A | * 2/1996 | Shibazaki ..................... 353/99 |
| 5,871,266 A | * 2/1999 | Negishi et al. ............... 353/98 |
| 6,255,661 B1 | * 7/2001 | Braat ....................... 250/492.2 |

FOREIGN PATENT DOCUMENTS

JP  97/91787  5/1998

* cited by examiner

*Primary Examiner*—Mark A. Robinson
(74) *Attorney, Agent, or Firm*—Morgan & Finnegan, LLP

(57) ABSTRACT

It is an object of this invention to provide a high-quality, high-precision, large-screen display apparatus which can obtain a sufficient light beam reception angle with respect to an image display unit, improve imaging performance, and obtain a thin structure. There is provided a display apparatus for obliquely projecting light from an image display unit onto a projection optical system, wherein the projection optical system includes a plurality of aspherical curved mirrors and projects an image without distortion (1.2% or less).

3 Claims, 6 Drawing Sheets

DISPLAY APPARATUS

BACKGROUND OF THE INVENTION

1. Field of the Invention

The present invention relates to an oblique projection type display apparatus and, more particularly, to a rear projection display apparatus designed to attain a reduction in depth of the apparatus by oblique projection.

2. Related Background Art

A conventional apparatus of this type is disclosed in WO 97/01787 or the like. FIG. 6 shows the arrangement of a projection optical system. The conventional technique shown in FIG. 6 is designed to obliquely project an image of an image display panel onto a screen without any trapezoidal distortion by using three to four coaxial aspherical reflecting mirrors and one vertical plane mirror.

When embodiments in the above prior art are traced and examined, it was found that a reception angle (corresponding to FNO) for a light beam emerging from an image display panel is a tradeoff for imaging performance (distortion characteristics, in particular), and it was difficult to obtain satisfactory optical performance.

The mirror data in Table 1 and the ray trace diagram of FIG. 6 show the tracing/examination results on an arrangement including three curved reflecting mirrors and one plane mirror. In this tracing/examination, the projection image maximum distortion was 1.1% and projection image average MTF (1 LP/mm) was 30% at projection FNO=6.0. Note that the image display panel display size in this case was 34 mm diagonal and 16:9 aspect ratio, and the enlarged display size on the screen was 60" (1524 mm) diagonal.

SUMMARY OF THE INVENTION

The present invention has been made to solve the above problems, and has as its object to provide a high-quality, high-precision, large-screen display apparatus which can obtain a sufficient light beam reception angle with respect to an image display unit, improve imaging performance, and obtain an ultra-low-profile structure.

In one aspect of the invention, there is provided a display apparatus which includes at least one image display means; and a projection optical system for obliquely projecting image light from said at least one image display means onto a projection surface, wherein said projection optical system includes a plurality of aspherical curved mirrors and projects the image light without distortion (not more than 1.2%).

In further aspect of the above display apparatus, the curved mirrors include at least six aspherical curved mirrors.

In further aspect of the above display apparatus, said projection optical system includes at least one plane mirror.

In further aspect of the above display apparatus, at least one of the plane mirrors is placed parallel to the projection surface.

In further aspect of the above display apparatus, said at least six aspherical curved mirrors and said at least one plane mirror are sequentially arranged from the image display means side.

In further aspect of the above display apparatus, an aperture stop is provided between said image display means and said projection optical system.

In further aspect of the above display apparatus, an aperture stop is provided between said image display means and said projection optical system.

In further aspect of the above display apparatus, an aperture stop is provided between a second curved mirror and a third curved mirror from the image display means side.

In further aspect of the above display apparatus, an aperture stop is provided between said image display means and the curved mirror.

TABLE 1

| FNO | 6.0 |
| Magnification | 44.4 |

| Reflecting Surface NO | r (Radius of Curvature [mm]) | d (Distance [mm]) | K (Cone Constant) |
| --- | --- | --- | --- |
| Panel Surface | infinity | 215.65 | |
| 1 | 251.360 | −281.88 | 0 |
| 2 | 434.812 | 238.00 | 9.957637 |
| 3 | −146.786 | −238.0 | −6.882988 |
| Plane Mirror | infinity | 295.00 | 0 |
| Screen | Infinity | | |

| Reflecting Surface NO | A (Aspherical Constant) | B (Aspherical Constant) | C (Aspherical Constant) | D (Aspherical Constant) |
| --- | --- | --- | --- | --- |
| 1 | 0 | 0 | 0 | 0 |
| 2 | 0.171926E-6 | −0.469882E-10 | 0.135238E-13 | −0.158164E-17 |
| 3 | 0.519197E-8 | −0.112461E-12 | 0.210605E-17 | −0.172466E-22 |

Of the data in Table 1, the sign of the surface distance d is reversed every time the propagating direction of a light beam from the image display panel is reversed when it is reflected by the curved reflecting mirror. The signs "+" and "−" of the radius of curvature r respectively indicate concave and convex surfaces.

In further aspect of the above display apparatus, an aperture stop is provided between a second curved mirror and a third curved mirror from the image display means side.

In further aspect of the above display apparatus, said projection optical system includes:

at least two plane mirrors arranged parallel to the projection surface; and an aperture stop.

In further aspect of the above display apparatus,
the projection surface receives light from said image display means and
the projection surface is constructed such that at least two eccentric Fresnel plates which have substantially the same structure are stacked on each other.

In further aspect of the above display apparatus, light from said image display means is projected on the projection surface from a rear surface thereof.

In another aspect of the invention, there is provided an image processing apparatus which includes said display apparatus set out in the foregoing; and
an image information input device for supplying image information to said display apparatus.

In further aspect of the above image processing apparatus, said image information input device comprises an arithmetic unit (computer).

In another aspect of the invention, there is provided a display apparatus which includes at least one image display means;
a projection surface; and
a projection optical system for obliquely projecting image light from said at least one image display means onto said projection surface,
wherein said projection optical system includes at least six aspherical curved mirrors and a plurality of plane mirrors which are sequentially arranged from the image display means side.

In further aspect of the above display apparatus, an aperture stop is provided between said curved mirror and said image display means.

In further aspect of the above display apparatus, an aperture stop is provided between second and third mirrors of the curved mirrors from said image display means.

In another aspect of the invention, there is provided a projection optical system for obliquely projecting light from image display means, comprising a plurality of aspherical curved mirrors, wherein an image is projected without distortion (not more than 1.2%).

DETAILED DESCRIPTION OF THE PREFERRED EMBODIMENTS

According to embodiments of the present invention, a projection system using six or more free-form mirrors is formed by applying the above arrangement so as to satisfy both the requirements for a sufficient light beam reception angle with respect to an image display panel and an improvement in imaging performance. This makes it possible to perform rear projection display on an ultra-thin, high-quality, high-precision, large screen.

The embodiments of the present invention will be described below.

First Embodiment

Figure 1:
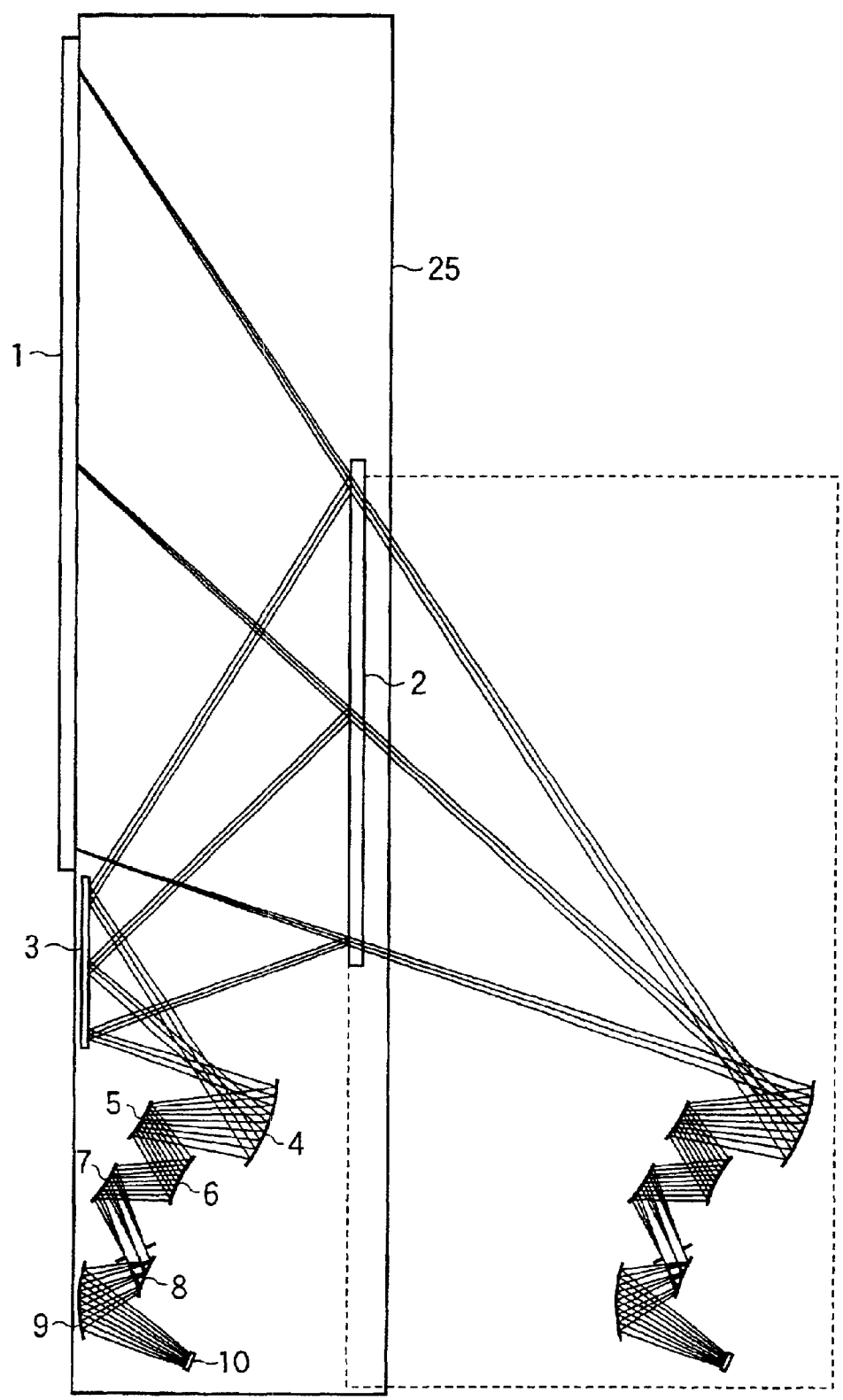
FIG. 1 is a sectional view showing the arrangement of a low-profile rear projection display apparatus according to the first embodiment of the present invention.

FIG. 1 is a sectional view showing the arrangement of a thin rear projection display apparatus according to the first embodiment of the present invention. Referring to FIG. 1, this apparatus includes an oblique incident screen 1, AL-deposited plane mirrors 2 and 3, AL-deposited free-form mirrors 4, 5, 6, 7, 8, and 9 which are rotationally asymmetric aspherical curved mirrors, a liquid crystal display device 10, and a casing 25. Note that the rectangular portion surrounded by the dashed line in FIG. 1 is a portion that is additionally written to facilitate the understanding of an oblique incident projection system basic to the present invention, and a rendering of projection without the plane mirrors 2 and 3.

Although FIG. 1 does not show parts other than those described above, the liquid crystal display device 10 is illuminated from the rear by an illumination system (not shown), and image light emerging from the front surface of the liquid crystal display device 10 travels toward the free-form mirror 9. As will be described in detail later, a light beam travels while being sequentially reflected by the free-form mirrors 4, 5, 6, 7, 8, and 9, and is finally reflected by the mirror 4 to emerge toward the plane mirror 3, as shown in the ray diagram of FIG. 1. In this case, this apparatus has an imaging effect based on combining of light beam reflection angle modulation effects of the respective surfaces, i.e., the overall effect of the six surfaces.

This imaging effect serves to enlarge/project the rectangular image surface of the liquid crystal panel 10 on the screen 1, which is placed obliquely with respect to the optical axis (optical axis incident angle of 42°). As shown in FIG. 1, therefore, a light beam emerging from the free-from mirror 4 is reflected first by the plane mirror 3 located below the screen 1, and the reflected light beam is further reflected by the plane mirror 2, which is located on the upper rear side of the apparatus, toward the upper front side. Thereafter, the screen 1 is irradiated with this light beam from below obliquely upward. That is, the image light is obliquely projected on the screen 1 in the end.

Note that the plane mirrors 2 and 3 are vertically arranged to be parallel with each other, together with the screen 1. With this layout, when a rear projection display apparatus is to be formed, its depth can be greatly decreased. According to this embodiment, a 9:16 aspect ratio (landscape), 60" diagonal display screen with a depth of 30 cm can be expected.

The overall arrangement and mechanism have been described so far. The projection system comprised of the free-form mirrors 4, 5, 6, 7, 8, and 9 and an aperture 11 will be described next.

Figure 2:
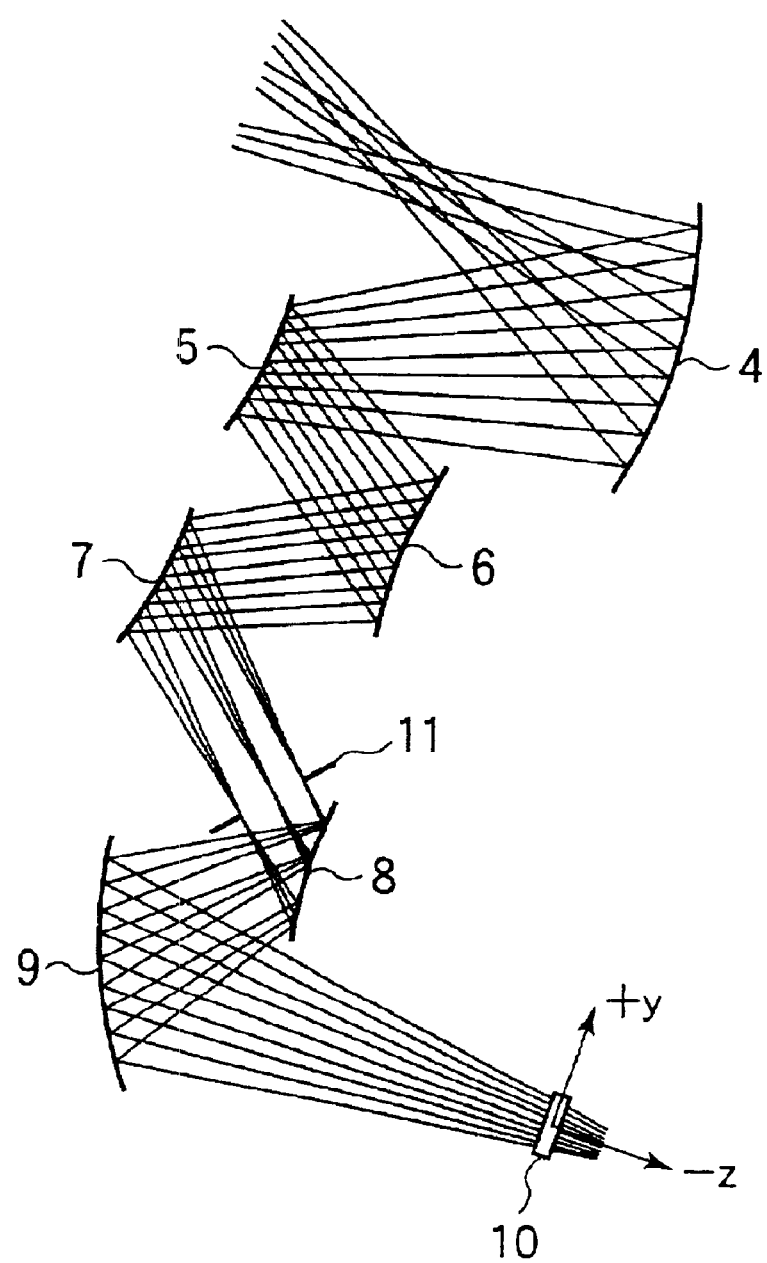
FIG. 2 is an enlarged sectional view showing the arrangement of the projection system of the low-profile rear projection display apparatus according to the first embodiment of the present invention.

FIG. 2 is an enlarged sectional view of the projection system. Table 2 shows the optical data (the surface separations of the respective surfaces, the tilt angles of the respective surfaces, the surface definitions of the respective surfaces, and the like) of the projection system. Note that the liquid crystal panel display size in this embodiment is 27 mm diagonal & 16:9 aspect ratio, and the enlarged display size on the screen is 60" (1524 mm) diagonal & 16:9 aspect ratio. With regard to coordinate systems in this case, the local coordinates on the respective surfaces (free-from reflecting surfaces in this case) are used to define the respective surfaces.

The center of the liquid crystal panel 10 is set as a first origin, and a normal passing through the origin is set as a first optical axis/z-axis (local z-axis) for defining a liquid crystal surface. The direction in which light emerges from the liquid crystal surface is defined as a positive z-axis direction. In this case, the y-axis is an axis coinciding with the upward direction as a positive direction on the drawing surface which is perpendicular to the z-axis, and the x-axis is an axis coinciding with the forward direction as a positive direction on the drawing surface which is perpendicular to the z- and y-axes.

A point apart from a coordinate value on each reflecting surface by a surface distance d (mm) along the z-axis (optical axis) is set as a next local origin. If a given surface has a tilt angle, the x-axis is set as a rotation axis, and the direction in which the positive y-axis direction approaches the positive z-axis direction (optical axis direction) is set as a positive direction. The x-, y-, and z-axis after the tilt are set as local coordinates for defining the reflecting surface. The free-form surface shapes of these reflecting surfaces are defined by an xy polynomial as follows:

$$z = C_4 x^2 + C_6 y^2 + C_8 x^2 y + C_{10} y^3 + C_{11} x^4 + C_{13} x^2 y^2 + C_{15} y^4 +$$
$$C_{17} x^4 y + C_{19} x^2 y^3 + C_{21} y^5 + C_{22} x^6 + C_{24} x^4 y^2 + C_{26} x^2 y^4 + C_{28} y^6$$

Table 2 given below shows the respective $C_n$ coefficient values and the like as the respective reflecting surface data.

Note that coordinate systems after reflection at the reflecting surfaces conform to the above coordinate definitions except that the z-axis polarity of the next local coordinate system is reversed with respect to the traveling direction of light. In this embodiment, therefore, the local coordinate system is defined such that the z-axis (optical axis) polarity is reversed for every reflection, and the signs of the surface distance d and tilt angle are reversed for each reflection.

In the projection system formed by a total of six free-from mirror surfaces, the free-form mirror formed by molding and AL deposition is held by a die cast frame (not shown) to be arranged in accordance with the optical data shown in Table 2.

TABLE 2

| FNO | 3.5 (based on relationship with aperture size) | |
|---|---|---|
| Magnification | 56.4 | |
| Surface | d[mm] (Surface Distance) | Tilt Angle [°] (rotation axis coincides with positive direction that is tilt direction in which x-axis/positive y direction rotates in positive z-axis direction) |
| Liquid Crystal Surface | 120.355 | 0 |
| Ninth Surface | −62.000 | 24.10 |
| Eighth Surface | 20.000 | −45.00 |
| Aperture | 66.054 | 0 |
| Seventh Surface | −65.000 | 36.37 |
| Sixth Surface | 60.952 | −32.48 |
| Fifth Surface | −112.928 | 30.00 |
| Fourth Surface | 95.1499 | −20.49 |
| Plane Mirror 3 | −295.000 | 42.00 |
| Plane Mirror 2 | 295.000 | −42.00 |
| Screen | | 42.00 |

| Reflecting Surface | $C_4$ | $C_6$ | $C_8$ | $C_{10}$ |
|---|---|---|---|---|
| Ninth Surface | −4.5884E-3 | −3.4275E-3 | 2.5854E-6 | 4.3012E-7 |
| Eighth Surface | −5.4838E-3 | −1.7940E-3 | 7.3906E-5 | 5.1839E-6 |
| Seventh Surface | 4.1171E-4 | −4.4187E-4 | 5.6620E-5 | −1.6014E-5 |
| Sixth Surface | 2.2449E-3 | 1.2939E-3 | 4.6241E-5 | −1.2609E-5 |
| Fifth Surface | 1.1310E-3 | 2.5863E-3 | 3.7000E-5 | 5.9829E-6 |
| Fourth Surface | 5.3472E-3 | 3.7596E-3 | −2.3969E-5 | −1.6790E-5 |

| Reflecting Surface | $C_{11}$ | $C_{13}$ | $C_{15}$ | $C_{17}$ | $C_{19}$ |
|---|---|---|---|---|---|
| Ninth Surface | −1.1349E-7 | −1.7316E-7 | −7.1215E-8 | 2.4169E-10 | 6.9478E-11 |
| Eighth Surface | −4.9216E-7 | −8.3895E-7 | −2.0548E-7 | 1.6790E-8 | 1.4899E-8 |
| Seventh Surface | 5.3979E-7 | −5.5956E-8 | 1.1600E-7 | 1.3042E-8 | 5.6446E-9 |
| Sixth Surface | 1.2510E-7 | −4.2937E-8 | 1.1542E-7 | 9.0994E-10 | 6.9117E-10 |
| Fifth Surface | −4.4928E-8 | −3.4118E-7 | 4.7489E-7 | −3.8844E-10 | −5.7955E-9 |
| Fourth Surface | −5.0709E-8 | 2.0786E-7 | 1.9881E-7 | 5.2909E-10 | −9.6599E-10 |

| Reflecting Surface | $C_{21}$ | $C_{22}$ | $C_{24}$ | $C_{26}$ | $C_{28}$ |
|---|---|---|---|---|---|
| Ninth Surface | −1.7555E-10 | −6.7660E-12 | −1.4753E-11 | −1.0332E-11 | −4.3099E-12 |

TABLE 2-continued

| | | | | | |
|---|---|---|---|---|---|
| Eighth Surface | 1.2259E-9 | 8.0779E-11 | -3.3503E-10 | -1.0214E-10 | -1.5825E-11 |
| Seventh Surface | -7.856E-10 | 6.2334E-11 | 2.3367E-10 | -2.3841E-11 | 5.1577E-12 |
| Sixth Surface | 3.4598E-10 | -3.3328E-12 | 5.0336E-12 | -9.1553E-12 | -5.3798E-13 |
| Fifth Surface | 3.5909E-9 | -5.4674E-12 | -5.8379E-11 | -1.4892E-10 | 1.4863E-10 |
| Fourth Surface | -1.6141E-9 | 1.0377E-11 | -4.8012E-12 | 4.5601E-12 | 8.8339E-12 |

According to the optical specifications achieved by this projection system, although the incident angle on the screen is as severe as 42°, the distortion is 0.5% or less, the average MTF is 80% (1 Lp/mm), the FNO is 3.5, and the brightness unevenness is 20% or less. That is, a sufficient light beam reception angle (FNO: 3.5) and imaging performance can be obtained; the achieved specifications can be applied to high-resolution, high-quality, image projection of a so-called high-vision level.

Figure 3:
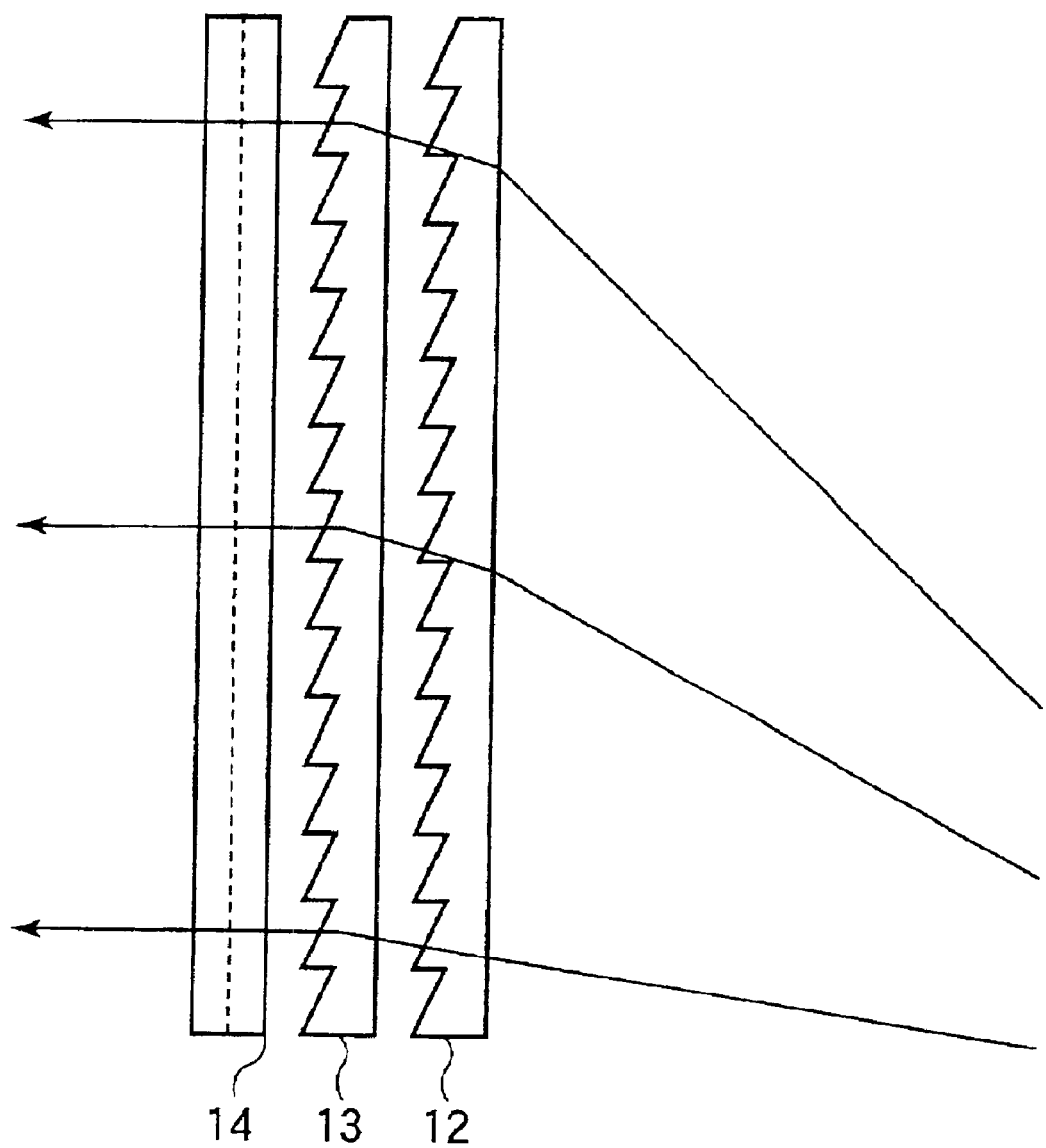
FIG. 3 is a sectional view showing the arrangement of an oblique incident screen according to the first embodiment of the present invention.

As the screen 1, a screen for oblique incidence is used in this embodiment. FIG. 3 shows a sectional arrangement of this screen. The screen is made up of three members, i.e., an eccentric Fresnel plate 12, eccentric Fresnel plate 13, and lenticular member 14, which are sequentially stacked on each other from the incident side. In this case, as these eccentric Fresnel plates 12 and 13, two mirrors having the same specifications are used (because such a severe requirement for oblique incidence cannot be satisfied by using only one eccentric Fresnel plate in terms of prism processing). As indicated by the thin arrow lines in FIG. 3, owing to the beam condensing effect of the two eccentric Fresnel plates, projection light incident from the rear side emerges from the entire surface in the forward direction (in other words, the power and eccentricity amount of each eccentric Fresnel plate are so set to obtain such refracting effect). In this case, the projection light diverges in the horizontal direction (the vertical direction in FIG. 3) by the lenticular member 14, and a projection image with uniform brightness is observed from the viewer side on the front side throughout a wide field of view.

This eccentric Fresnel plate can be formed by cutting a plate from a general concentric Fresnel plate at a position offset from its center by a predetermined distance.

As described above, according to this embodiment, although a sufficient light beam reception angle, i.e., FNO: 3.5, and the above excellent imaging performance can be obtained, if the number of free-form surfaces is reduced to 4 or 5, an inconvenience occurs in terms of an optical parameter associated with MTF, distortion, or the like. According to the study conducted by the present applicants, no good effect could be obtained. This may be because if desired optical performance is to be obtained even under a severe condition, i.e., oblique incidence, a corresponding number of variable parameters are required.

The arrangement described above is merely an embodiment, and hence can be variably arranged. In this embodiment, six free-form mirrors are used to form a projection system. However, seven or more mirrors may be used without posing any problem. In addition, the liquid crystal panel is used as a display device. However, the present invention is not limited to this, and a thin rear projection display apparatus can be formed by using a reflection type device such as a DMD, an organic EL display device, or the like. Furthermore, as for the screen arrangement, the lenticular member may be replaced with a diffusion plate, and the eccentric Fresnel plate may be replaced with a linear Fresnel plate, hologram plate, hologram sheet, or the like.

Second Embodiment

Figure 4:
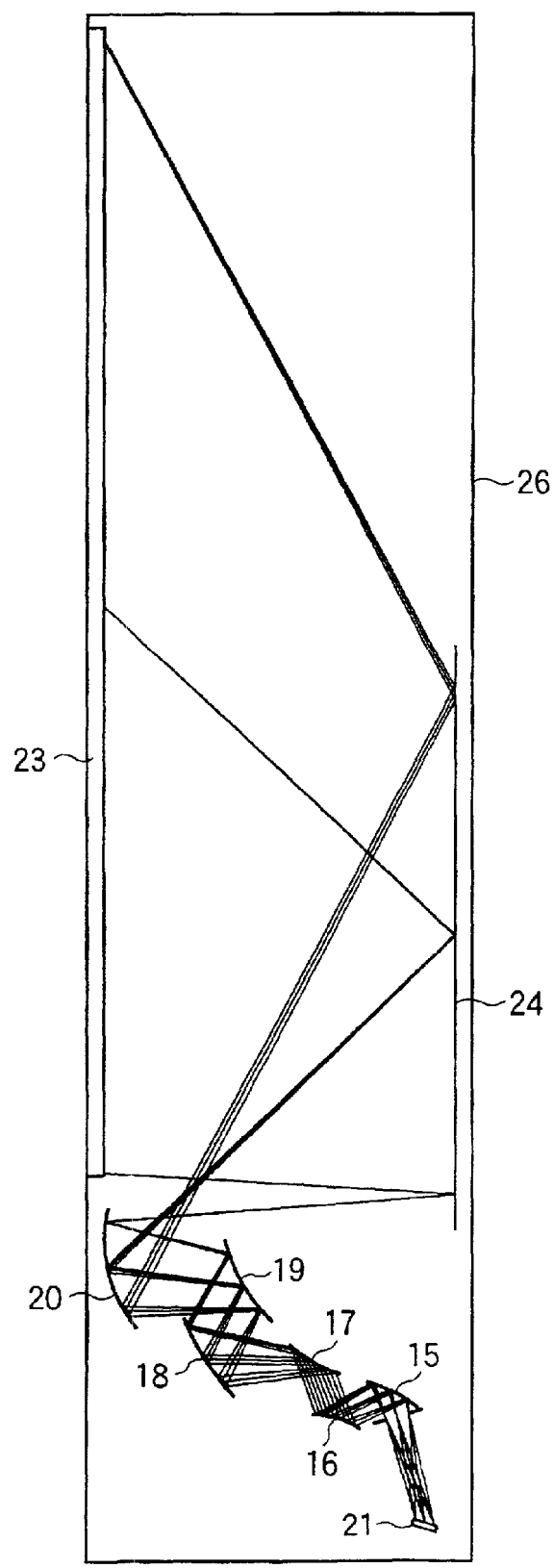
FIG. 4 is a sectional view showing the arrangement of a thin rear projection display apparatus according to the second embodiment of the present invention.

FIG. 4 is a sectional view showing the arrangement of a thin rear projection display apparatus according to the second embodiment of the present invention. Referring to FIG. 4, this apparatus includes an oblique incident screen 23, AL-deposited plane mirror 24, Al-deposited free-from mirrors 15, 16, 17, 18, 19, and 20, DMD display device 21, and casing 26. Note that as DMD display devices, for example, the devices disclosed in Japanese Patent Nos.2664300, 2978224, and 2978285are widely known.

Although FIG. 4 does not show parts other than those described above, the DMD display device 21 is illuminated from an upper side by an illumination system (not shown), and image light reflected from the DMD display device 21 travels toward the free-form mirror 20. As in the above embodiment, a light beam travels while being sequentially reflected by the free-form mirrors 15, 16, 17, 18, 19, and 20 is finally reflected by the mirror 20 to emerge toward the plane mirror 24, as shown in the ray diagram of FIG. 4. In this case, this apparatus has an imaging effect based on the synthesis of light beam reflection angle modulation effects of the respective surfaces, i.e., the overall effect of the six surfaces.

This imaging effect serves to enlarge/project the rectangular image surface of the DMD panel 21 on the screen 23, which is placed obliquely with respect to the optical axis (optical axis incident angle of 40.3°). As shown in FIG. 4, therefore, a light beam emerging from the free-from mirror 20 is reflected by the plane mirror 24 located behind the screen, i.e., on the rear side of the apparatus. Thereafter, the screen 23 is irradiated with this light beam from below obliquely upward. That is, the image light is obliquely projected on the screen 23 from a lower side.

Note that the plane mirror 24 is vertically placed to be parallel with the screen 23. With this layout, as in the above embodiment, when a rear projection display apparatus is to be formed, its depth can be greatly decreased. According to this embodiment, a 5:3 aspect ratio (landscape), 60" diagonal display screen with a depth of 30 cm can be expected. In addition, in this embodiment, only one plane mirror is used, and the free-form mirrors 15, 16, 17, 18, 19, and 20 extend parallel to the rear projection apparatus. This layout allows a reduction in the total height of the apparatus as compared with the preceding embodiment. As for the above screen size, a total height of 110 cm or less can be expected.

Figure 5:
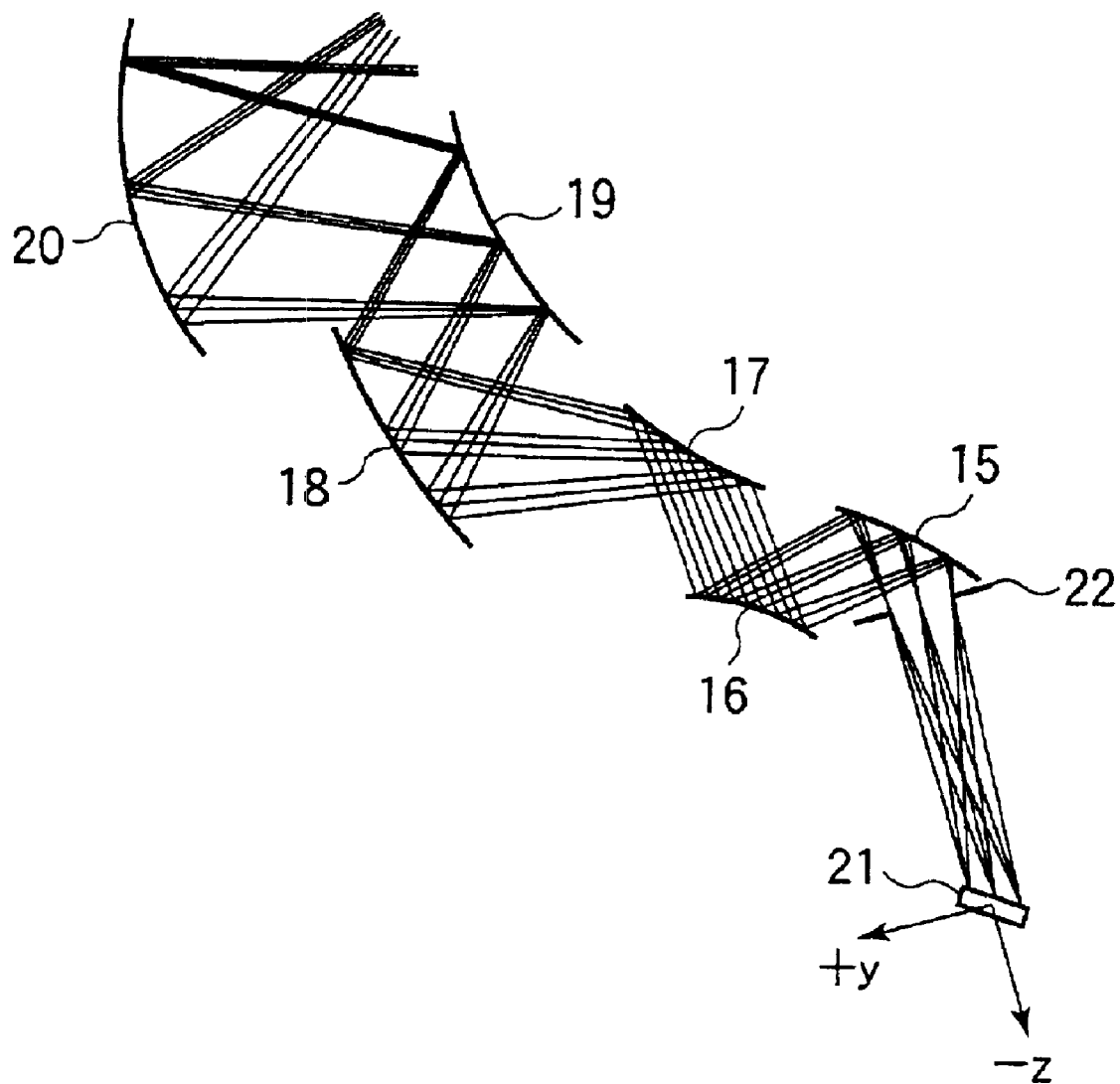
FIG. 5 is an enlarged sectional view showing the arrangement of the projection system of the thin rear projection display apparatus according to the second embodiment of the present invention.
Figure 6:
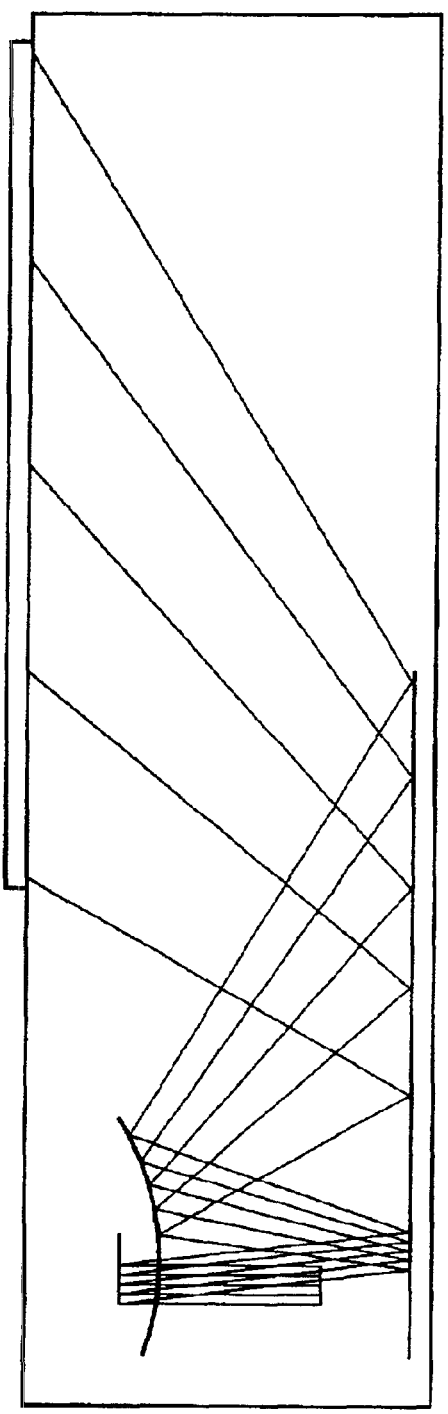
FIG. 6 is a view showing an overall conventional low-profile rear projection optical system.

The overall arrangement and mechanism have been described so far. The projection system comprised of the free-form mirrors 15, 16, 17, 18, 19, and 20 and an aperture 22 will be described next. FIG. 5 is an enlarged sectional view of the projection system. Table 3 shows the optical data (the surface separations of the respective surfaces, the tilt angles of the respective surfaces, the surface definitions of the respective surfaces, and the like) of the projection system. Note that the DMD panel display size in this embodiment is 21 mm diagonal & 5:3 aspect ratio, and the enlarged display size on the screen is 60″ (1524 mm) diagonal & 5:3 aspect ratio. With regard to coordinate systems in this case, the local coordinates on the respective surfaces (free-from reflecting surfaces in this case) are used to define the respective surfaces.

The center of the DMD panel 21 is set as a first origin, and a straight line connecting the origin and the center of the aperture 22 is set as a first optical axis/z-axis (local z-axis). The direction in which light emerges from the liquid crystal surface is defined as a positive z-axis direction. In this case, the y-axis is an axis coinciding with the leftward direction as a positive direction on the drawing surface which is perpendicular to the z-axis, and the x-axis is an axis coinciding with the forward direction as a positive direction on the drawing surface which is perpendicular to the z- and y-axis.

As in the preceding embodiment, a point separated from a coordinate value on each reflecting surface by a surface distance d (mm) along the z-axis (optical axis) is set as a next local origin. If a given surface has a tilt angle, the x-axis is set as a rotation axis, and the direction in which the positive y-axis direction approaches the positive z-axis direction (optical axis direction) is set as a positive direction. The x-, y-, and z-axis after the tilt are set as local coordinates for defining the reflecting surface. In this embodiment, the DMD panel itself is tilted at +38.0170°. The free-form surface shapes of these reflecting surfaces are defined by an xy polynomial as follows:

$$z = C_4 x^2 + C_6 y^2 + C_8 x^2 y + C_{10} y^3 + C_{11} x^4 + C_{13} x^2 y^2 + C_{15} y^4 +$$
$$C_{17} x^4 y + C_{19} x^2 y^3 + C_{21} y^5 + C_{22} x^6 + C_{24} x^4 y^2 + C_{26} x^2 y^4 + C_{28} y^6$$

Table 3 given below shows the respective $C_n$ coefficient values and the like as the respective reflecting surface data.

Note that coordinate systems after reflection at the reflecting surfaces conform to the above coordinate definitions except that the z-axis polarity of the next local coordinate system is reversed with respect to the traveling direction of light. In this embodiment, therefore, the local coordinate system is defined such that the z-axis (optical axis) polarity is reversed for every reflection, and the signs of the surface distance d and tilt angle are reversed for each reflection.

As in the preceding embodiment, in the projection system formed by a total of six free-from mirror surfaces, the free-form mirror formed by molding and AL deposition is held by a die cast frame (not shown) to be arranged in accordance with the optical data shown in Table 3.

TABLE 3

| FNO | 4.6 (based on aperture size) | |
|---|---|---|
| Magnification | 72.5 | |
| Surface | d[mm] (Surface Distance) | Tilt Angle [°] (rotation axis coincides with positive direction that is tilt direction in which x-axis/positive y direction rotates in positive z-axis direction) |

| Surface | d[mm] | Tilt Angle |
|---|---|---|
| DMD Surface | 83.000 | 38.017 |
| Aperture | 15.836 | 0.000 |
| 20th Surface | −43.930 | 38.603 |
| 19th Surface | 44.627 | −43.151 |
| 18th Surface | −73.116 | 56.766 |
| 17th Surface | 60.558 | −31.851 |
| 16th Surface | −100.042 | 35.889 |
| 15th Surface | 354.000 | −21.999 |
| Plane Mirror | −354.000 | 40.30 |
| Screen | | −40.30 |

| Reflecting Surface | $C_4$ | $C_6$ | $C_8$ | $C_{10}$ |
|---|---|---|---|---|
| 20th Surface | −5.5542E-3 | −3.8935E-3 | −1.8045E-5 | −6.4231E-6 |
| 19th Surface | −1.7045E-3 | −1.3621E-3 | −1.1014E-4 | −3.6759E-5 |
| 18th Surface | 5.4890E-3 | 2.1130E-3 | −5.4810E-5 | 3.9701E-5 |
| 17th Surface | 4.5864E-3 | 1.8464E-3 | −8.1612E-6 | 2.6422E-6 |
| 16th Surface | 9.6278E-3 | 1.5852E-3 | 1.9096E-5 | −2.5710E-5 |
| 15th Surface | 7.8106E-3 | 4.3619E-3 | 3.3695E-5 | 1.7541E-5 |

| Reflecting Surface | $C_{11}$ | $C_{13}$ | $C_{15}$ | $C_{17}$ | $C_{19}$ |
|---|---|---|---|---|---|
| 20th Surface | −2.1321E-7 | −4.7665E-7 | −1.7739E-7 | −3.2345E-9 | −1.5098E-9 |
| 19th Surface | −9.5505E-7 | −2.9033E-6 | −1.3288E-6 | −5.8551E-8 | −1.0072E-7 |
| 18th Surface | −3.3133E-7 | 7.0577E-8 | 3.0403E-7 | −9.4654E-9 | −3.6720E-8 |
| 17th Surface | −7.9480E-8 | 4.0016E-7 | 1.6277E-7 | −2.0123E-9 | 1.4100E-9 |
| 16th Surface | −6.4138E-6 | 3.7365E-6 | 6.6103E-7 | 1.3636E-8 | 5.1520E-8 |
| 15th Surface | 1.6671E-7 | 1.7313E-8 | 1.3574E-7 | 1.1791E-9 | −4.6506E-9 |

| Reflecting Surface | $C_{21}$ | $C_{22}$ | $C_{24}$ | $C_{26}$ | $C_{28}$ |
|---|---|---|---|---|---|

TABLE 3-continued

| | | | | | |
|---|---|---|---|---|---|
| 20th Surface | −5.4541E-10 | 2.6900E-12 | −6.3213E-11 | 9.0113E-12 | 2.2693E-12 |
| 19th Surface | −3.3646E-8 | 2.0071E-11 | −2.2254E-9 | −2.1570E-9 | −4.8443E-10 |
| 18th Surface | −3.7392E-9 | 8.8691E-10 | 8.4074E-10 | −2.4130E-10 | 1.8190E-11 |
| 17th Surface | −5.0361E-9 | −2.0956E-11 | 4.4791E-11 | −1.4289E-10 | −4.3554E-11 |
| 16th Surface | 3.3848E-11 | 2.5347E-9 | −1.6434E-9 | −1.8916E-9 | −3.7693E-10 |
| 15th Surface | 1.7954E-9 | 8.8106E-12 | 1.7533E-11 | −2.2737E-11 | 2.1279E-11 |

According to the optical specifications achieved by this projection system, although the incident angle on the screen is as severe as 40.3°, the distortion is 1.2% or less, the average MTF is 40% (1 Lp/mm), the FNO is 4.6, and the brightness unevenness is 20% or less. That is, a sufficient light beam reception angle (FNO: 4.6) and imaging performance for a DMD panel can be obtained. As in the preceding embodiment, the achieved specifications can be applied to high-quality image projection of a DTV or the like. Strictly speaking, in this embodiment, although the optical performance slightly deteriorates as compared with the preceding embodiment, the total height of the apparatus can be decreased more.

The screen 23 in this embodiment is identical to the screen 1 in the preceding embodiment.

In the above embodiments, one or two plan mirrors are used. However, a further reduction in the depth of a display apparatus may be attained by folding the optical path using three or more plane mirrors.

In addition, an image processing apparatus may be formed by combining the display apparatus of this embodiment and an image information input device for supplying image information. This image processing apparatus may be a video deck or the like or an arithmetic unit such as a computer.

As has been described above, this embodiment can satisfy both the requirements for a sufficient light beam reception angle with respect to an image display panel and an improvement in imaging performance. This makes it possible to realize a high-quality, ultra-thin, large-screen display apparatus.

What is claimed is:

1. A display apparatus comprising:

at least one image display means:

a projection surface; and a projection optical system for obliquely projecting image light from said at least one image display means onto said projection surface, wherein said projection optical system includes at least six aspherical curved mirrors and a plurality of plane mirrors which are sequentially arranged from the image display means side, and wherein said projection optical system projects the image light with a distortion equal to or less than 0.5% and a brightness unevenness on the projection surface by the image light is equal to or less than 20%.

2. An apparatus according to claim 1, further comprising an aperture stop between at least one of said curved mirrors and said image display means.

3. An apparatus according to claim 1, further comprising an aperture stop between second and third mirrors of the curved mirrors from said image display means side.

* * * * *